J. KRABILL.
TRACTION WHEEL.
APPLICATION FILED JULY 9, 1920.
1,403,790.
Patented Jan. 17, 1922.
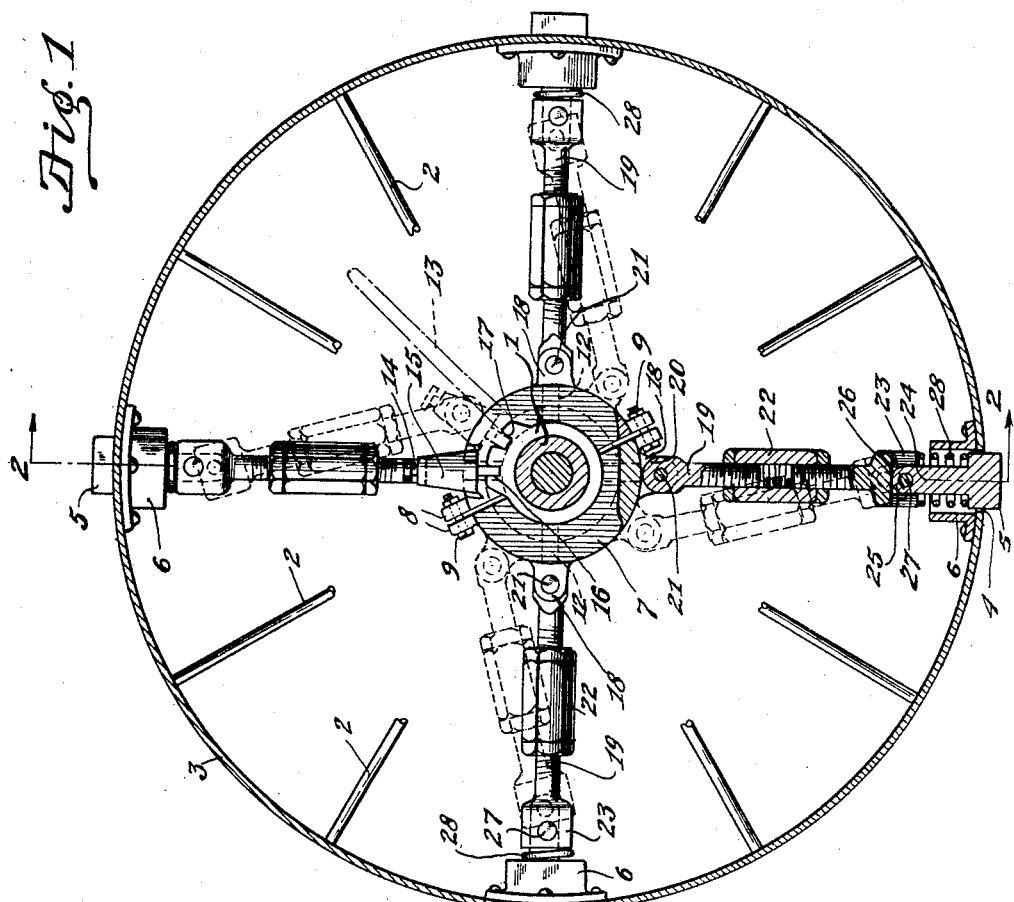
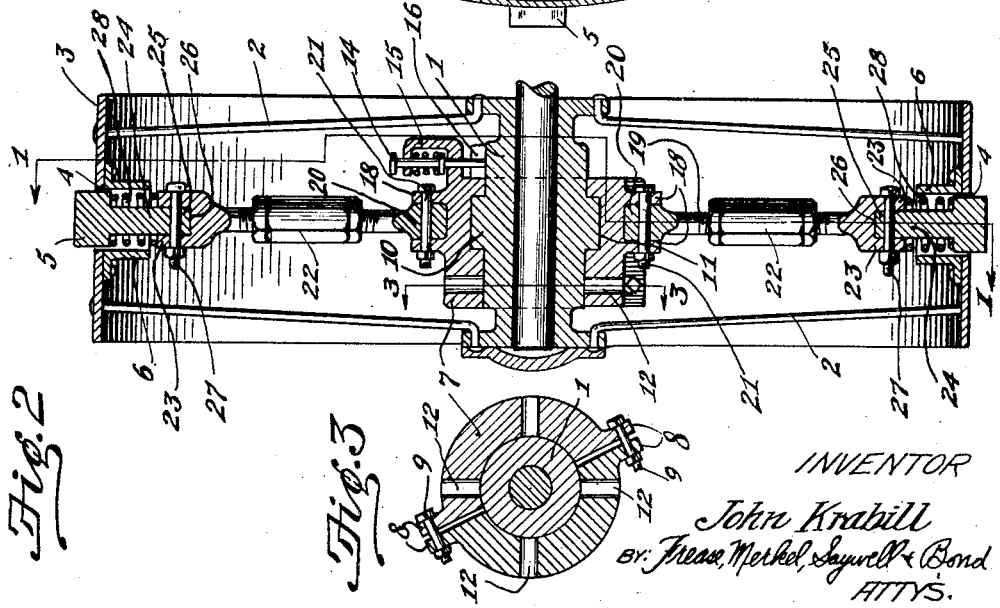
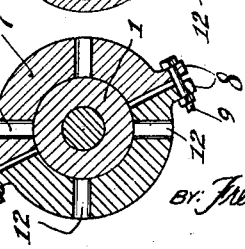
INVENTOR
John Krabill
BY Frease, Merkel, Saywell & Bond
ATTYS.

UNITED STATES PATENT OFFICE.

JOHN KRABILL, OF CANTON, OHIO, ASSIGNOR TO DAVID KRABILL, OF MASSILLON, OHIO.

TRACTION WHEEL.

1,403,790.

Specification of Letters Patent.  Patented Jan. 17, 1922.

Application filed July 9, 1920. Serial No. 394,922.

*To all whom it may concern:*

Be it known that I, JOHN KRABILL, a citizen of the United States, residing at Canton, in the county of Stark and State of Ohio, have invented new and useful Traction Wheels, of which the following is a specification.

This invention relates to improvements in traction wheels and more particularly to that type of traction wheel which is provided with lugs or blocks arranged to be projecting into an operative position or withdrawn into an inoperative position.

The objects of this invention are the provision of a traction wheel for use upon traction engines or the like provided with means for moving mud lugs or blocks out through the rim of the wheel and for withdrawing the lugs within the line of the wheel at the will of the operator, means being also provided for holding the lugs in either position.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a section on the line 1—1, Fig. 2.

Fig. 2 is a section on the line 2—2, Fig. 1.

Fig. 3 is a section on the line 3—3, Fig. 2.

A practical embodiment of the invention is disclosed in the accompanying drawings, forming a part of this specification in which similar numerals of reference indicate corresponding parts throughout the several views.

In the drawings the invention is shown as applied to a traction wheel of any ordinary or desired construction embodying a hub 1 having spokes 2 radiating from the ends thereof and carrying at their outer extremities the usual rim 3.

The rim of the wheel is provided at spaced intervals with openings 4 of a size and corresponding to the sectional contour of the lugs 5, an inwardly disposed flange 6 of the same size and contour as the opening being provided around each of said openings upon the inner side of the rim, for the purpose of guiding the lugs in operation and rigidly supporting the lugs.

An operating device is provided for projecting the lugs into an operative position or withdrawing the lugs into an inoperative position at the will of the operator. This operating mechanism comprises a collar 7 formed of two halves and adapted to encircle the hub 1, end flanges 8 being formed upon said halves adapted to abut when the sections are in position to encircle the hub, suitable fastening means such as the bolts 9 engaging the end flanges and securing the collar in position upon the hub.

The hub is provided with a central annular rib 10 and the collar 7 is provided with an annular groove 11 of suitable size to accommodate said rib, thus preventing end movement of the collar upon the hub. The collar 7 is provided at intervals with radial sockets 12 arranged to receive a handle 13 by means of which the collar may be rotated upon the hub. A spring pressed pawl 14 is mounted in the bearing 15 formed upon the collar and arranged to be seated in the sockets 16 and 17 in order to hold the ring in the operative or inoperative position respectively.

Spaced ears 18 are located at intervals around the periphery of the collar 7 and the operating rods 19 are each provided with a rounded head 20 pivotally connected to the adjacent pair of ears by the bolt or the like 21, the rounded inner surface of the head resting upon the collar 7.

Each of the operating rods 19 is formed of two screw threaded portions connected together by a turn-buckle 22 by means of which the length of the rod may be adjusted in order to provide for any desired height of the lugs. Ears 23 are provided at the outer extremity of each operating rod and each of the lugs 5 is provided with an inwardly disposed neck 24 having an inner rounded end 25 which rests against the shoulder 26 of the operating rod, a bolt 27 or the like pivotally connecting each lug to the ears 23. A coil spring 28 is located around each neck 24 between the ears 23 and the head of the lug for the purpose of steadying each of the lugs and preventing any rattling thereof.

From the above it will be evident that the lugs may be projected into an operative and withdrawn into an inoperative position by the rotation of the collar, means being provided for locking the collar in either the operative or inoperative position as desired.

It will be seen that in the use of the mud lugs in the projected position the rounded ends of the necks of the mud lugs will bear upon the shoulders 26 of the operating rods and the rounded heads of the operating rods will bear upon the collar 7, thus relieving the rods of considerable of the strain excepting that necessary to project or withdraw the lugs.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:—

1. A traction wheel comprising a rim having openings therethrough, lugs adapted to move through said openings, a collar journaled upon the hub of the wheel, operating rods pivotally connected to the hub, each rod having a rounded head engaging the periphery of the collar, each of said rods being pivotally connected to one of the lugs, each lug having a rounded end engaging the end of the operating rod, means for rotating the collar upon the hub to project or withdraw the lugs through the openings in the rim and means for locking the collar in either position to hold the lugs in either the projected or withdrawn position.

2. A traction wheel comprising a rim having openings therethrough, lugs adapted to move through said openings, a collar journaled upon the hub of the wheel, operating rods pivotally connected to the hub, each rod having a rounded head engaging the periphery of the collar, each of said rods being pivotally connected to one of the lugs, each lug having a rounded end engaging the end of the operating rod, a head formed upon each lug, a coil spring located between said head and the extremity of each operating rod, means for rotating the collar upon the hub to project or withdraw the lugs through the openings in the rim and means for locking the collar in either position to hold the lugs in either the projected or withdrawn position.

In testimony that I claim the above, I have hereunto subscribed my name.

JOHN KRABILL.